(12) United States Patent
Doar

(10) Patent No.: US 7,958,455 B2
(45) Date of Patent: Jun. 7, 2011

(54) MODE ACTIVATED SCROLLING

(75) Inventor: Jeffrey Braun Doar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 1200 days.

(21) Appl. No.: 10/272,714

(22) Filed: Oct. 16, 2002

(65) Prior Publication Data

US 2004/0021694 A1 Feb. 5, 2004

Related U.S. Application Data

(60) Provisional application No. 60/400,861, filed on Aug. 1, 2002.

(51) Int. Cl.
*G06F 3/048* (2006.01)
(52) U.S. Cl. ......... 715/784; 715/785; 715/786; 715/787
(58) Field of Classification Search ................ 715/784, 715/785, 786, 787
See application file for complete search history.

(56) References Cited

U.S. PATENT DOCUMENTS

| | | | |
|---|---|---|---|
| 4,866,602 A | 9/1989 | Hall | |
| 5,125,077 A | 6/1992 | Hall | |
| 5,196,838 A * | 3/1993 | Meier et al. ................ | 345/684 |
| D349,280 S | 8/1994 | Kaneko | |
| 5,414,445 A | 5/1995 | Kaneko et al. | |
| D362,431 S | 9/1995 | Kaneko et al. | |
| 5,473,343 A | 12/1995 | Kimmich et al. | |
| 5,473,344 A | 12/1995 | Bacon et al. | |
| 5,495,566 A | 2/1996 | Kwatinetz | |
| 5,528,260 A * | 6/1996 | Kent ............................ | 345/684 |
| 5,559,943 A | 9/1996 | Cyr et al. | |
| 5,565,887 A | 10/1996 | McCambridge et al. | |
| 5,596,347 A | 1/1997 | Robertson et al. | |
| 5,598,183 A | 1/1997 | Robertson et al. | |
| 5,611,040 A | 3/1997 | Brewer et al. | |
| 5,611,060 A | 3/1997 | Belfiore et al. | |
| D382,550 S | 8/1997 | Kaneko et al. | |
| 5,655,094 A * | 8/1997 | Cline et al. .................... | 715/786 |
| D385,542 S | 10/1997 | Kaneko et al. | |
| 5,726,687 A | 3/1998 | Belfiore et al. | |
| 5,754,890 A | 5/1998 | Holmdahl et al. | |
| 5,786,818 A | 7/1998 | Brewer et al. | |
| 5,828,364 A | 10/1998 | Siddiqui | |
| 5,838,304 A | 11/1998 | Hall | |
| D402,281 S | 12/1998 | Ledbetter et al. | |
| 5,877,448 A * | 3/1999 | Denton et al. ............... | 102/401 |
| 5,999,176 A * | 12/1999 | Kamper ........................ | 715/787 |
| 6,031,518 A | 2/2000 | Adams et al. | |
| 6,075,533 A * | 6/2000 | Chang .......................... | 715/786 |
| 6,166,721 A | 12/2000 | Kuroiwa et al. | |
| 6,188,393 B1 | 2/2001 | Shu | |

(Continued)

OTHER PUBLICATIONS

Microsoft Excel copyright 1999.*

(Continued)

*Primary Examiner* — Weilun Lo
*Assistant Examiner* — Shashi K Becker
(74) *Attorney, Agent, or Firm* — Beyer Law Group LLP

(57) ABSTRACT

A computer implemented method for changing between a cursor control mode and a scroll control mode. The cursor control mode allowing a user to move a cursor on a graphical user interface (GUI) and the scroll control mode allowing a user to scroll on the GUI. The cursor and scroll movements are based on positional data supplied by an input device such as a mouse.

33 Claims, 6 Drawing Sheets

U.S. PATENT DOCUMENTS

| | | |
|---|---|---|
| 6,191,774 B1 | 2/2001 | Schena et al. |
| 6,198,473 B1 | 3/2001 | Armstrong |
| 6,211,861 B1 | 4/2001 | Rosenberg et al. |
| D442,592 S | 5/2001 | Ledbetter et al. |
| 6,225,980 B1 | 5/2001 | Weiss et al. |
| D443,616 S | 6/2001 | Fisher et al. |
| 6,297,795 B1 | 10/2001 | Kato et al. |
| 6,392,676 B1* | 5/2002 | Mori et al. ............... 715/861 |
| 6,396,487 B1* | 5/2002 | Jameson ................. 715/788 |
| 6,462,752 B1* | 10/2002 | Ma et al. ................. 345/684 |
| 6,954,899 B1* | 10/2005 | Anderson ................ 715/701 |
| 2001/0011991 A1 | 8/2001 | Wang et al. |
| 2001/0012025 A1* | 8/2001 | Wojaczynski et al. ........ 345/856 |
| 2002/0126155 A1* | 9/2002 | Lin-Hendel ............... 345/785 |
| 2003/0043174 A1* | 3/2003 | Hinckley et al. ............. 345/684 |
| 2004/0169681 A1* | 9/2004 | Van Kesteren et al. ....... 345/764 |
| 2007/0109326 A1* | 5/2007 | Meier et al. ................. 345/684 |

OTHER PUBLICATIONS www.technologyforall.com, Oct. 17, 2000.*
Microsoft.com, IntelliMouse SDK, 1999.*
"Application Design Guidelines for the IntelliMouse Pointing Device," Microsoft.com., copyright 1999.*
IBM Techinical Disclosure Bulletin, NN9706181 Jun. 1997, US (19970601), pp. 181-182.*
"System Service and Troubleshooting Manual", www.dsplib.com/intv/Master, downloaded Dec. 11, 2002.

* cited by examiner

MODE ACTIVATED SCROLLING

CROSS REFERENCE TO RELATED APPLICATIONS

This application claims the priority of the following U.S. Provisional Patent Application No. 60/400,861, filed on Aug. 1, 2002 and entitled "MODE ACTIVATED SCROLLING" which is hereby incorporated herein by reference.

BACKGROUND OF THE INVENTION

1. Field of the Invention

The present invention relates generally to a computer system. More particularly, the present invention relates to switching between modes of the computer system, as for example, a cursor control mode and a scroll control mode.

2. Description of the Related Art

Graphical user interfaces have been around for some time. Graphical user interfaces are generally defined as a computer environment or program that displays, or facilitates the display of, text, graphics and on screen options to a user. By way of example, text or graphics may be displayed in a window, and on screen options may take the form of images that initiate tasks when selected. By way of example, the on screen options may include icons or tool bar items such as File, Edit, Window, Help, etc. In toolbar items, a first mouse click typically opens a pull down menu, and a second mouse click either makes a menu selection or closes the pull down menu. In order to make a menu selection, the user typically positions a cursor over the desired menu item with the mouse (or other related device), and then performs a clicking action with the button of the mouse (or other related device). The cursor may take the form of a highlight bar when moved over a menu item. The highlight bar generally indicates that a subsequent clicking action will initiate tasks associated with this particular menu item.

The graphical user interface (GUI) may also include a scroll bar for scrolling through the window. The scroll bar is typically located around the periphery of the window inside a window frame. There may be a vertical scroll bar for vertical scrolling and a horizontal bar for horizontal scrolling. In either case, the scroll bar typically includes a scroll tab that moves linearly within the scroll bar to actuate the scrolling function. Movement of the scroll tab causes scrolling of the contents in the window, as for example lines of text or graphical images. In order to move the scroll tab, a user must first position a cursor or pointer over the scroll tab with a mouse. The user must then select the tab by performing a clicking action with the button of the mouse. Once the scroll tab has been selected, the user can move the scroll tab within the scroll bar by continuously holding down the button and moving the mouse along a surface (e.g., hold and drag). For example, the mouse may be moved forwards and backwards to implement up and down or vertical scrolling.

This method of scrolling is not very ergonomic, i.e., hand fatigue and other hand related problems (e.g., carpal tunnel syndrome) may be incurred by the user when the button is continuously held down to drag the scroll tab from one point to another point. This is particular true when scrolling through large amounts of data as for example internet documents, word processing and spreadsheet documents, computer code documents, graphical documents (CAD), etc.

Alternatively, the scroll tab may be moved by selecting the open space of scroll bar on either side of the scroll tab or by selecting a scroll arrow that moves the scroll tab in the direction of the arrow. Using these techniques, the tab may be incrementally moved by making multiple selections with the button or continuously moved by holding down the button of the mouse. Incremental movements are typically only performed to do block scrolling, i.e., scrolling through large sections of data (e.g., paragraphs). Both incremental and continuous movement suffer from the same drawbacks as mentioned above, i.e., not very ergonomic.

In recent years, scrolling through a window on a graphical user interface has been implemented with a scroll wheel located on the mouse. The scroll wheel allows a user to vertically scroll through documents by rolling the wheel forward or backward-instead of selecting the scroll bar displayed on the GUI. The mouse may also provide a dedicated button that changes the mouse from a cursor control device to a scroll control device where moving the mouse forwards and backwards initiates vertical scrolling via the vertical scroll bar instead of moving the cursor. Scrolling in this manner may allow a user to scroll without having to continuously hold down the primary button of the mouse or to continuously run a finger over a wheel. Furthermore, the vertical scroll bar may change its shape and color when scrolling in this manner. For example, it may change from a gray tab to a black arrow. Unfortunately, however, a special mouse having special wheels and/or buttons must be provided. As such, a user that owns a conventional mouse cannot scroll in this manner. Furthermore, each of these items adds complexity and cost to the mouse.

Scrolling has also been implemented with a touch pad using a one and a half click method, i.e., tap and tap and hold. The tap and hold initiates a drag lock enabling the user to scroll by moving their finger about the touch pad. This is sometimes called "gesturing." This method, however, suffers from the same drawbacks as mentioned above. For example, it is not very ergonomic and other types of input devices cannot scroll in this manner (e.g., a conventional mouse). Furthermore, this method provides no visual feedback as to which state the touch pad is in, and its not very intuitive, i.e., its very confusing to use.

In view of the foregoing, an improved scrolling technique that is ergonomic (e.g., allows the mouse to scroll through a window without holding down a button), that is available to all users regardless of the input device (e.g., does not need a dedicated button) and/or that provides visual stimulus indicating that scrolling is initiated is desired.

SUMMARY OF THE INVENTION

The invention relates, in one embodiment, to a method of implementing mode activated scrolling in a computer system having a display for displaying a graphical user interface (GUI), an input device for supplying position data associated with controlling cursor or scroll movements on the GUI and a command generator for supplying command data associated with executing tasks on the GUI. The system provides a cursor control mode for allowing movements of a cursor to be controlled on the GUI via the input device and a scroll control mode for allowing scrolling to be controlled on the GUI via the input device. The method includes determining a location of the cursor on the GUI during the cursor control mode. The method also includes determining a status of the command generator during the cursor control mode. The method further includes switching from the cursor control mode to the scroll control mode when the cursor is positioned over an onscreen option of the GUI and when the command generator is activated.

The invention relates, in another embodiment, to a method of switching between movement modes in a computer system having a display for displaying a graphical user interface (GUI), an input device for supplying position data associated with controlling cursor or scroll movements on the GUI and a command generator for supplying command data associated with executing tasks on the GUI. The method includes monitoring position data so as to implement a cursor event or a scroll event. The cursor event is associated with moving a cursor and the scroll event is associated with moving a scroll tab. The method also includes monitoring command data so as to implement selection events. The method further includes locking position data to the scroll event when the cursor is positioned on an onscreen option of the GUI during a first selection event. The method additionally includes unlocking position data from the scroll event during a second selection event.

The invention relates, in another embodiment, to a method of executing a modal change between a cursor control mode and a scroll control mode in a computer system having a display for displaying a graphical user interface and an input device for supplying position data associated with controlling cursor and scroll movements on the graphical user interface. The cursor control mode allows movements of a cursor to be controlled on the graphical user interface via the input device and the scroll control mode allows scrolling to be controlled on the graphical user interface via the input device. The method includes selecting an onscreen option of the graphical user interface with a computer implemented action when the input device is in a cursor control mode so as to place the input device in the scroll control mode. The method also includes performing another computer implemented action when the input device is in the scroll control mode so as to place the input device back in the cursor control mode.

The invention relates, in another embodiment, to a graphical user interface (GUI). The GUI includes a graphical image for executing a modal change of an input device when the graphical image is selected, the modal change being configured to switch the input device from a cursor control mode for moving a cursor to a scroll control mode for scrolling.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
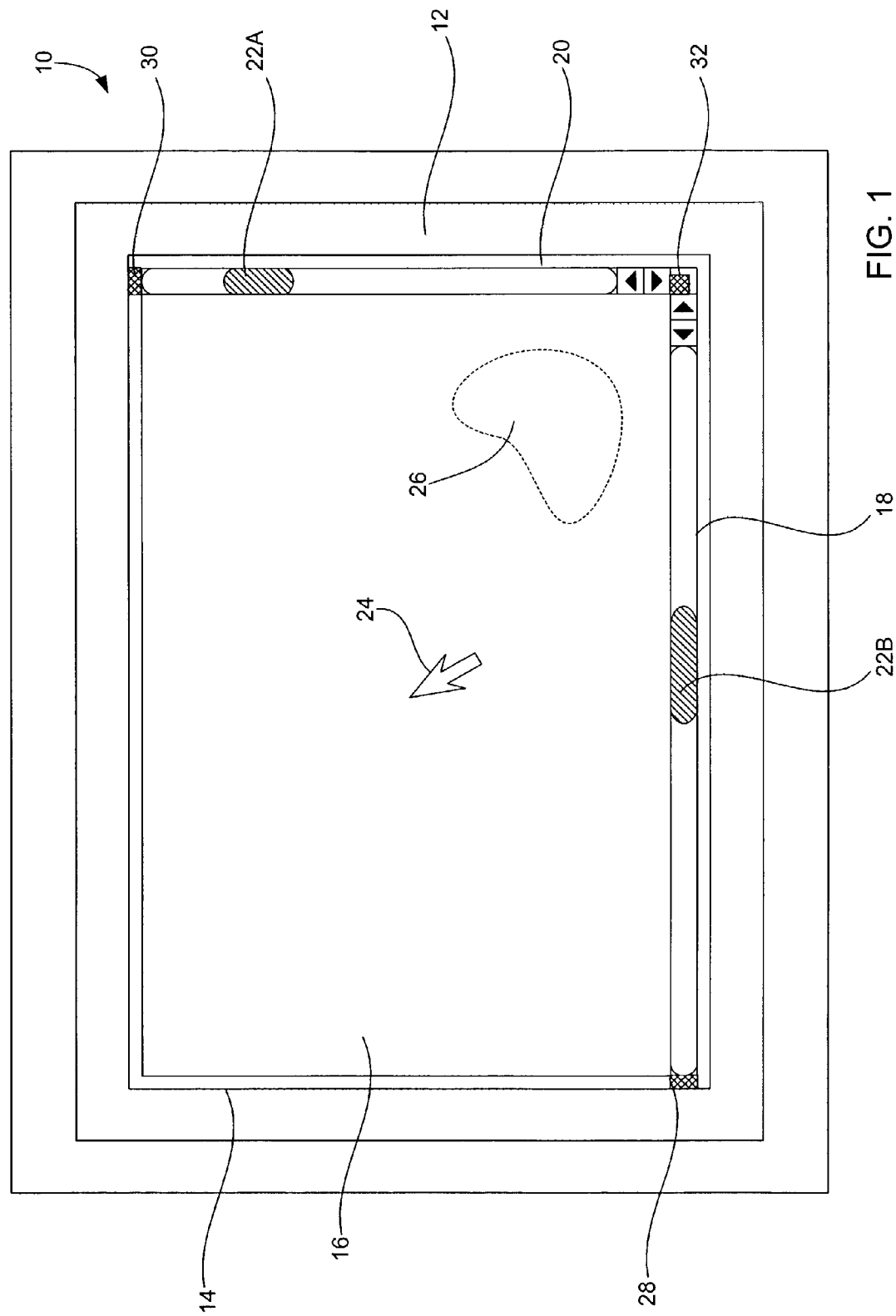
FIG. 1 is a simplified diagram of a display utilizing a graphical user interface, in accordance with one embodiment of the present invention.

Embodiments of the invention are discussed below with reference to FIGS. 1-5. However, those skilled in the art will readily appreciate that the detailed description given herein with respect to these figures is for explanatory purposes as the invention extends beyond these limited embodiments.

The present invention pertains to a computer system having at least a display, an input device and a command generator. The display is generally configured to display a graphical user interface, i.e., a computer environment or program that displays, or facilitates the display of, text, graphics and on screen options to a user. By way of example, the graphical user interface may be part of an operating system (O/S) of the computer system. The input device, on the other hand, is generally configured to supply position data associated with controlling movements (e.g., cursor, scroll, pan) in the graphical user interface. By way of example, the input device may be a mouse, a trackball, a touch pad, joystick and the like. Furthermore, the command generator is configured to supply command data associated with implementing actions in the graphical user interface (e.g., selecting a file or opening a menu). For example, the command generator may be an input device button that provides a clicking action (e.g., mouse button), a keyboard key such as enter or function key, and/or the like.

The computer system is generally configured to provide at least a cursor control mode and a scroll control mode. The cursor control mode allows a user to move a cursor on the GUI via the input device. The scroll control mode allows a user to scroll on the GUI via the input device. By way of example, scrolling may be used to help perform internet browsing, spreadsheet manipulation, viewing code, computer aided design, and the like. In either case, the movements are based on positional data supplied by the input device. The positional data is generally locked in each mode such that the control is accomplished without holding down a button. In mice, the positional data is produced via a ball that monitors the movement of the mouse along a surface. Alternatively, an optical sensor may be used. For ease of discussion, the input device as used herein will be directed at the mouse. It should be appreciated, however, that this is not a limitation and that the other devices may be used (e.g., trackball, touch pad, or joystick).

Scrolling generally refers to a method of moving a GUI or portions thereof up, down, left or right in order to bring more data into view on the display screen (e.g., list scrolling, window scrolling). For example, during scrolling, each new set of data may appear at the top, bottom, left or right of the viewing area of the display screen and all other sets of data may move up, down, or to the side one position. If the viewing area is full, the peripheral set of data moves out of the viewing area while a new set of data enters the viewing area. Up and down movements are generally referred to as vertical or y axis scrolling and left to right (or side to side) movements are generally referred to as horizontal or x axis scrolling. Although these are the primary scrolling movements, it should be noted that they are not a limitation. For example, scrolling may also encompass panning (e.g., simultaneous vertical and horizontal scrolling), z axis scrolling such as zoom in and out, 3D scrolling such as x, y and/or z axis rotation and the like. The scrolling movements are generally based on the movements of the mouse.

The system also gives a user the ability to switch between the cursor control mode (e.g., moving a cursor with a mouse) and the scroll control mode (e.g., moving the contents of a window up/down or side to side with the mouse). For example, when a user wants to scroll, the user can switch between modes such that further movement of the mouse results in scrolling rather than moving a cursor (e.g., tracking).

In one embodiment, switching between modes is implemented by selecting a predetermined area of the GUI. For example, switching may be implemented by moving a GUI object such as a cursor or scroll tab to the predetermined area via the mouse (e.g., positional data) and selecting the predetermined area via a clicking action of the primary mouse button (e.g., not a dedicated button). Switching back to the original mode may, in some cases, be implemented by simply generating a second clicking action. In other cases, switching back may be implemented via a delay time or a period of inactivity, as for example, 20-30 seconds. The predetermined area may be located almost anywhere within the GUI, although it is generally located within the active portion of the GUI, as for example an active window frame. In one implementation, the predetermined area is presented by the GUI as an onscreen option that when actuated informs the computer system as to which mode to implement when the mouse is moved along the surface. As should be appreciated, onscreen options are applications or functions for performing a specific task. By way of example, the onscreen options may include images such as icons, toolbar items, menu items and the like. In one particular embodiment, the onscreen option is a portion of a window frame contained in a GUI, as for example, the scroll bar or scroll tab.

FIG. 1 is a simplified diagram of a display 10 utilizing a graphical user interface 12, in accordance with one embodiment of the present invention. The graphical user interface 12 includes a window frame 14. The window frame 14 includes a window or field 16 having contents contained therein. By way of example, the window 16 may contain text, icons, and the like. The window frame 14 also includes a horizontal scroll bar 18 and a vertical scroll bar 20. Both scroll bars 18, 20 are positioned adjacent the window 16, but within the window frame 14. As shown, the horizontal scroll bar 18 is disposed below the window 16, and the vertical scroll bar 20 is disposed to the right of the window 16. The scroll bars 18, 20 are configured to allow a user to scroll through the contents of the window 16. For example, the horizontal scroll bar permits horizontal scrolling while the vertical scroll bar permits vertical scrolling.

As shown, each of the scroll bars 18, 20 includes a scroll tab 22 that moves within the respective scroll bar 18, 20. Movement of the scroll tab 22 within the scroll bar 18, 20 generally initiates scrolling through the contents of the window 16. In most cases, the scroll tab 22 is moved via a hold and drag function with the mouse. For example, a user typically selects the scroll tab 22 by moving a cursor 24 over the scroll tab 22 and initiating a continuous button click with the mouse. While maintaining the button click, the user then moves the cursor 24 via the mouse to move the scroll tab 22 within the scroll bar 18 or 20.

Scrolling may be implemented vertically (up or down) with the vertical scroll tab 22A or horizontally (left or right) with the horizontal scroll tab 22B. For example, the mouse (when in the hold and drag function) may be arranged to move the vertical scroll tab 22A and thus the contents of the window 16 vertically up when moved forward, and vertically down when moved backwards. In addition, the mouse (when in the hold and drag function) may be arranged to move the horizontal scroll tab 22B and thus the contents of the window 16 horizontally when moved from side to side. In the case of vertical scrolling, when a user moves the scroll tab 22A down, each new set of data appears at the bottom of the window 16 (e.g., viewing area) and all other sets of data move up one position. If the window 16 is full, the top set of data moves out of the window 16. Similarly, when a user moves the scroll tab 22A up, each new set of data appears at the top of the window 16 and all other sets of data move down one position. If the window 16 is full, the bottom set of data moves out of the window 16. The same can be said for horizontal scrolling (e.g., side to side rather than up and down).

The GUI 12 also includes one or more predetermined areas 26 that represent regions of the GUI 12 that may be actuated by a user so as to switch the system (in which the GUI 12 is used) between a cursor control mode and a scroll control mode. The cursor control mode is configured to lock the movement of the mouse to cursor movements across the GUI. The scroll control mode is configured to lock the movement of the mouse to scroll tab movements within the scroll bar. The predetermined area 26 is generally configured to activate at least one of the different GUI movements (e.g., cursor or scroll) when the cursor or scroll bar is positioned proximate the predetermined area 26 and during a clicking action of the mouse. For example, during a clicking action, the system may activate cursor control mode when the scroll tab 22 is positioned proximate the predetermined area 26 or it may activate the scroll control mode when the cursor 24 is positioned proximate the predetermined area 26. Switching back to the original mode may, in some cases, be implemented by simply generating a second clicking action with or without being proximate the predetermined area 26. Switching back may also be implemented by a delay time or period of inactivity.

The position of the predetermined area 26 relative to the GUI 12 may be widely varied. For example, the predetermined area 26 may be positioned almost anywhere (e.g., top, side, middle, bottom) on the GUI 12 so long as it is accessible to a user during manipulation of the cursor 24 or scroll tab 22. In most cases, they are located within the active area of the GUI, as for example, the window frame 16. The number of predetermined areas 26 may also be widely varied. That is, although only one predetermined area 26 is shown in FIG. 1, it should be noted that a plurality of predetermined areas 26 may be used. The plurality of predetermined areas may be arranged to work together or independent of one another (e.g., separate switches).

In one embodiment, the predetermined areas 26 are on screen options located within the window frame 16. For example, as shown in FIG. 1, the window frame 16 may include onscreen options 28 and 30 that are located at the ends of the scroll bars 18 and 20, respectively. The onscreen option 28 is generally associated with the horizontal scroll bar and the onscreen option 30 is generally associated with the vertical scroll bar. In this particular example, when the system is in the cursor control mode, a horizontal scroll control mode is implemented when the horizontal onscreen option 28 is selected, and a vertical scroll control mode is implemented when the vertical onscreen option 30 is selected. That is, the control modes are switched from cursor control to scroll control. Additionally or alternatively, another onscreen option 32 may be used implement panning rather than scrolling. Panning is generally defined as simultaneous vertical and horizontal scrolling. In the illustrated embodiment, the panning onscreen option is located opposite the onscreen option 28, 30 at the ends of the scroll bars 18, 20 in the corner of the window frame 16.

In another embodiment, the on screen option is built into an already existing image of the window frame, as for example, a portion of the scroll bar 18, 20 such as the scroll tab 22. In this particular example, when the system is in the cursor control mode, the horizontal scroll control mode is implemented when the horizontal scroll tab 22B is selected, and a vertical scroll control mode is implemented when the vertical scroll tab 22A is selected. That is, the control modes are switched from cursor control to scroll control. Additionally or alternatively, panning may be implemented by selecting either of the scroll tabs twice in succession (e.g., performing a double clicking action with the button of the mouse).

In either of the aforementioned embodiments, a visual indication may be used on the GUI to inform the user as to which mode is activated. For example, the onscreen option may change its appearance as for example its image, color, shape, location, size, and the like when selected.

Figure 2:
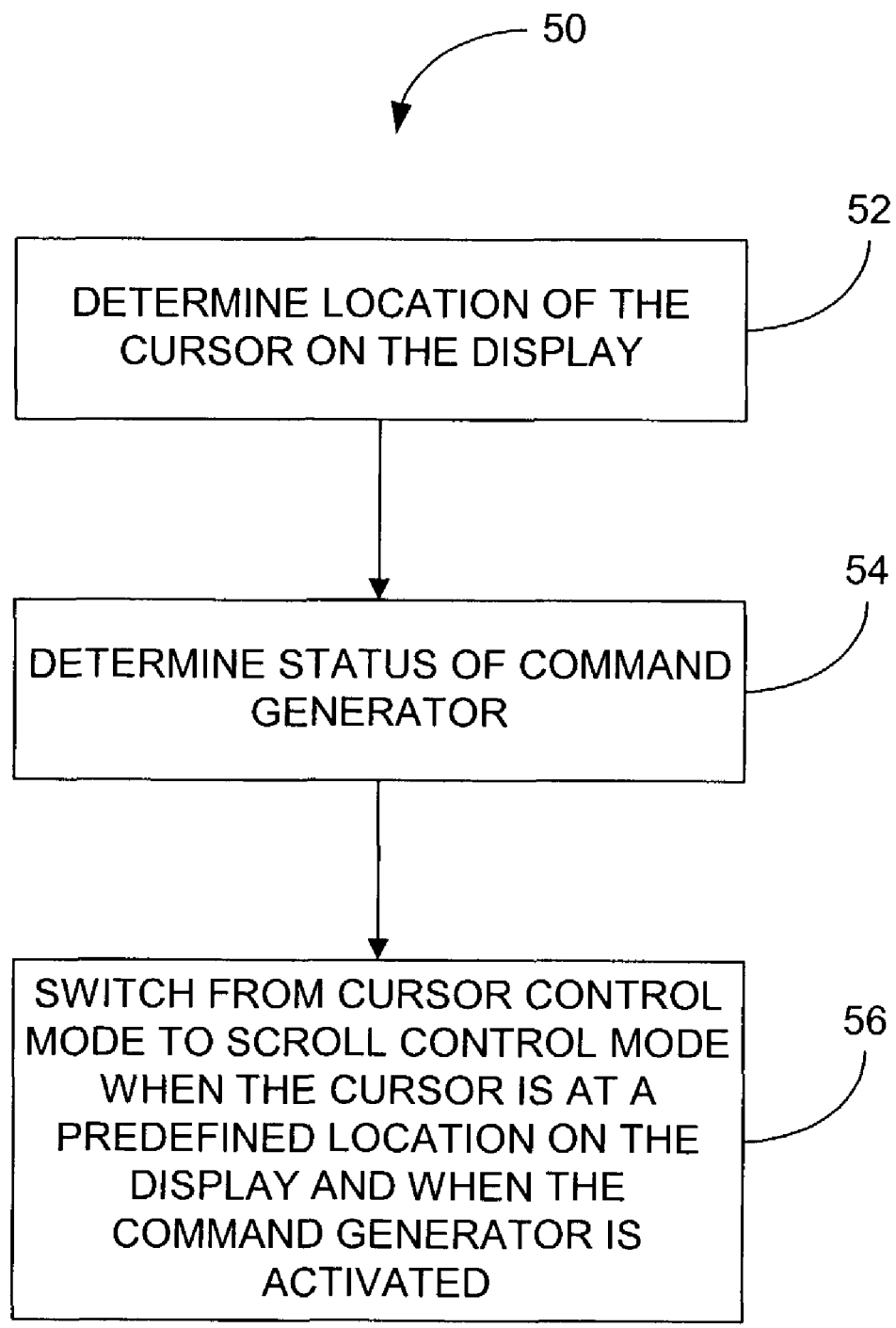
FIG. 2 is a process flow diagram of mode activated scrolling, in accordance with one embodiment of the present invention.

FIG. 2 is a process flow diagram of mode activated scrolling 50, in accordance with one embodiment of the present invention. By way of example, mode activated scrolling 50 may be implemented on the GUI 12 shown in FIG. 1. The process flow generally begins at block 52 where a determination is made as to the location of the cursor on the GUI during the cursor control mode. Again, the cursor control mode is associated with moving the cursor across the GUI with a mouse. For example, the cursor control mode may lock the movement of the cursor to the movement of the mouse. The location is generally determined using standard computer processing.

Following block 52, the process flow proceeds to block 54 where a determination is made as to the status of the command generator during the cursor control mode. In most cases, the command generator has an idle state and an activated state. By way of example, the activated state may be implemented by a clicking action via a button of a mouse. The status is generally determined using standard computer processing.

During blocks 52 and 54, if the cursor is at a predefined location when the command generator is activated then the process flow proceeds to block 56 where the system is switched from the cursor control mode to the scroll control mode. By way of example, the predefined location may correspond to the predetermined area described in FIG. 1. Again, the scroll control mode is associated with scrolling through a GUI. For example, the scroll control mode may lock the movement of the scroll tab to the movement of the mouse.

Although not shown, the process flow may include additional or alternate blocks. For example, if the command generator is activated during the scroll control mode then the process flow may proceed from block 56 to another block where the system is switched from the scroll control mode to the cursor control mode.

Figure 3:
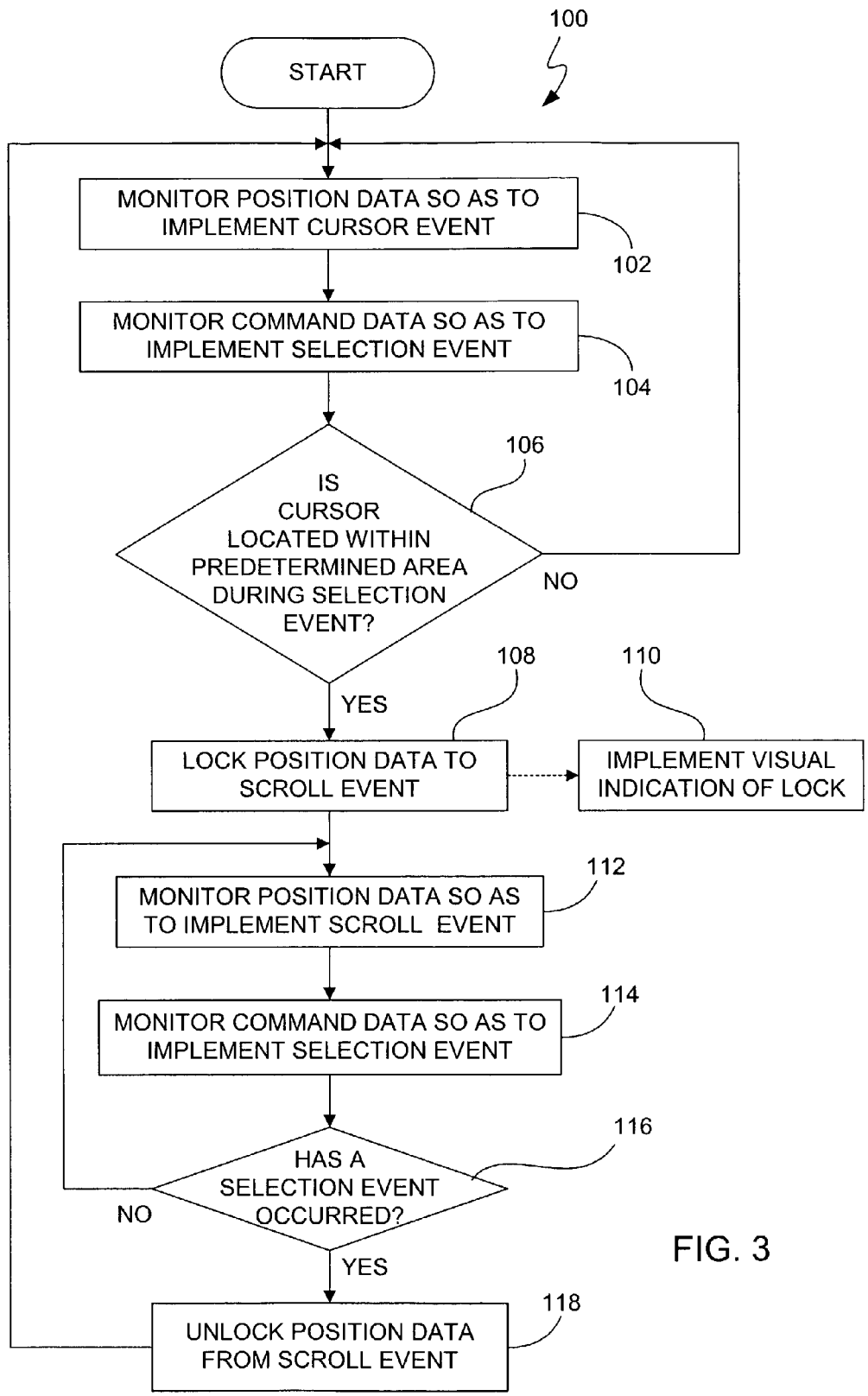
FIG. 3 is a process flow diagram of modal switching, in accordance with one embodiment of the present invention.

FIG. 3 is a process flow diagram of modal switching 100, in accordance with one embodiment of the present invention. The process flow generally begins at block 102 where position data is monitored. By way of example, the position data may be produced by an input device such as a mouse. The position data is generally monitored in block 102 so as to implement a cursor event. By way of example, the cursor event may be associated with moving a cursor on a display screen.

Following block 102, the process flow proceeds to block 104 where command data is monitored. By way of example, the command data may be generated by a command generator such as the button of a mouse that provides a clicking action. The command data is generally monitored so as to implement a selection event when the command generator is activated. The selection event may be associated with selecting a predetermined area of the GUI such as an onscreen option.

During the selection event, a determination is made at block 106 as to where the cursor is located. If the cursor is not located in a predefined location (e.g., predetermined area) of the GUI then the process flow proceeds back to the start. If the cursor is located within a predefined location (e.g., predetermined area) of the GUI then the process flow proceeds to block 108 where the position data is locked to a scroll event. At the same time, a visual indication of the scroll lock may be implemented as shown in block 110. By way of example, the visual indication may cause the scroll tab to change colors, size, shape, etc.

Following block 108 the process flow proceeds to block 112 where the position data is monitored. By way of example, the position data may be produced by an input device such as a mouse. The position data is generally monitored in block 112 so as to implement the scroll event. By way of example, the scroll event may be associated with moving a scroll tab to scroll through an active window. Alternatively, the scroll event may be associated with moving a window directly with mouse movements (i.e., without moving an object of the GUI).

During the scroll event, the process flow proceeds to block 114 where the command data is monitored. By way of example, the command data may be generated by a command generator such as the button of a mouse that provides a clicking action. The command data is generally monitored so as to implement a second selection event when the command generator is activated. The selection event may be associated with selecting a predetermined area of the GUI such as an onscreen option or it may be associated with any area of the GUI, i.e., the clicking action itself (no predefined location is needed).

During command monitoring, the process flow proceeds to block 116 where a determination is made as to whether a second selection has occurred. If a second selection has not occurred then the process flow proceeds back to step 102. If a second selection event has occurred then the process flow proceeds to block 118 where the position data is unlocked from the scroll event. Once unlocked, the process flow proceeds back to the start of the process flow (e.g., blocks 102/ 102).

Alternatively or additionally, during block 112 (position data monitoring associated with scroll events) the process flow may include a time out that deactivates the scroll lock if a scroll event has not been performed for a predetermined amount of time, i.e., a period of inactivity. Once deactivated (or unlocked), the process flow typically proceeds back to block 102 (position data monitoring associated with cursor events).

A diagrammatic example of the above process flow is shown in FIGS. 4A-4F, in accordance with one embodiment of the present invention. FIGS. 4A-4F are diagrams of a window frame 150 shown on a GUI interface. The GUI interface is generally presented on a display of a computer system. Movements on the GUI, and thus the around the window frame 150 are generally controlled via an input device such as a mouse. By way of example, the window frame 150 may correspond to the window frame shown in FIG. 1. The window frame may be widely varied. In the illustrated embodiment, the window frame 150 has a window 152, a horizontal scroll bar 154 and a vertical scroll bar 156. The window 152 is configured to contain a plurality of icons 158. It should be noted, however, that this is not a limitation and that the contents of the window may vary according to the specific needs of the computer system. For example, it may include text or graphics associated with word processing, spreadsheet, or drafting programs.

Figure 4A:
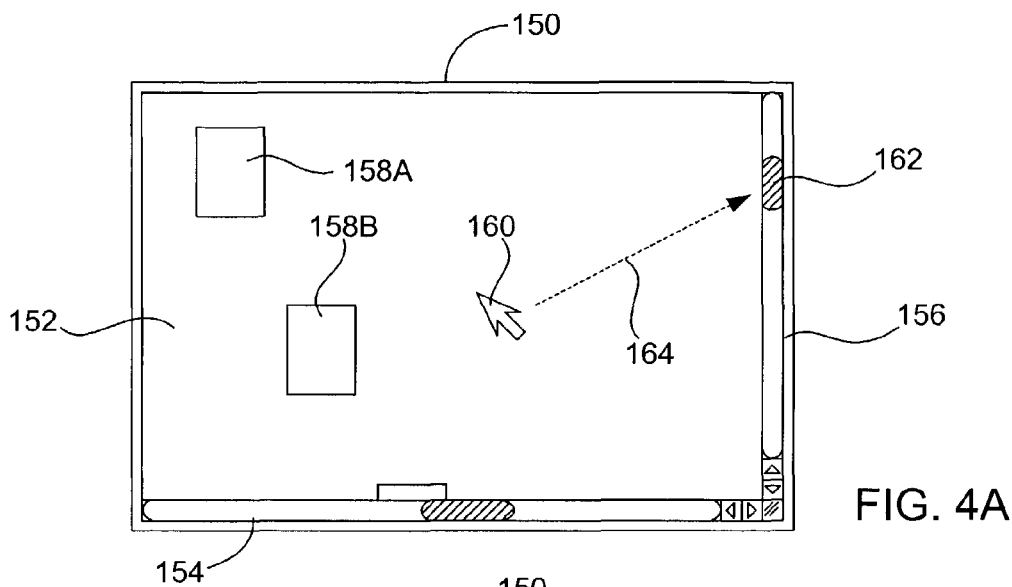
FIGS. 4A-4F are a diagrammatic example of the process flow shown in FIG. 3, in accordance with one embodiment of the present invention.

FIG. 4A shows the GUI in a cursor control mode where movements of a mouse correspond to similar movements of a pointer 160 on the GUI 148, i.e., the position data of the mouse is monitored so as to implement pointer movements. In this particular Figure, the cursor 160 is moved via the mouse to the vertical scroll tab 162 of the vertical scroll bar 156. The movement is shown by dotted line 164.

Figure 4B:
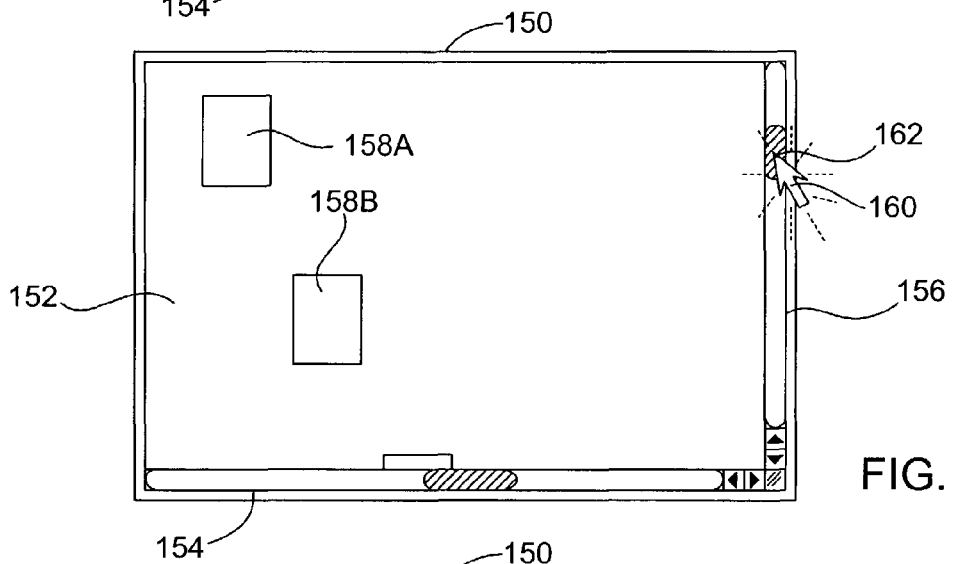

FIG. 4B shows the GUI in a transitioning state (e.g., from cursor control mode to scroll control mode) where a clicking action of the mouse selects the vertical scroll tab 162 of the vertical scroll bar 156. As shown, the pointer 160 is positioned directly over the scroll tab 162. For illustration purposes, the clicking action is shown as lines emanating from the pointer 160. Here, the command data from the mouse informs, the system to implement a scroll lock.

Figure 4C:
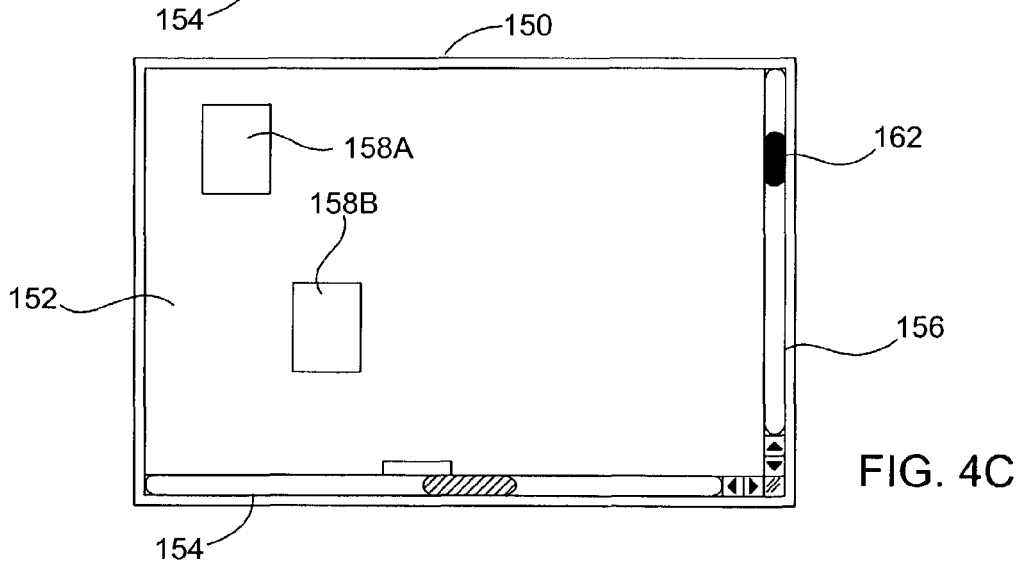

FIG. 4C shows the GUI in a scroll control mode where movements of the mouse correspond to similar movements of the scroll tab 162, i.e., the position data of the mouse is monitored by the system so as to implement tab movements when the mouse is moved along a surface. As shown, the scroll tab 162 changes color (e.g., from cross hatching to solid black) to indicate to the user that the system is in the scroll control mode, i.e., the vertical scroll tab is active. Furthermore, the pointer disappears. As should be appreciated, the color change provides visual stimulus to the user that informs the user that movements of the mouse are used for scrolling rather than moving a cursor.

Figure 4D:
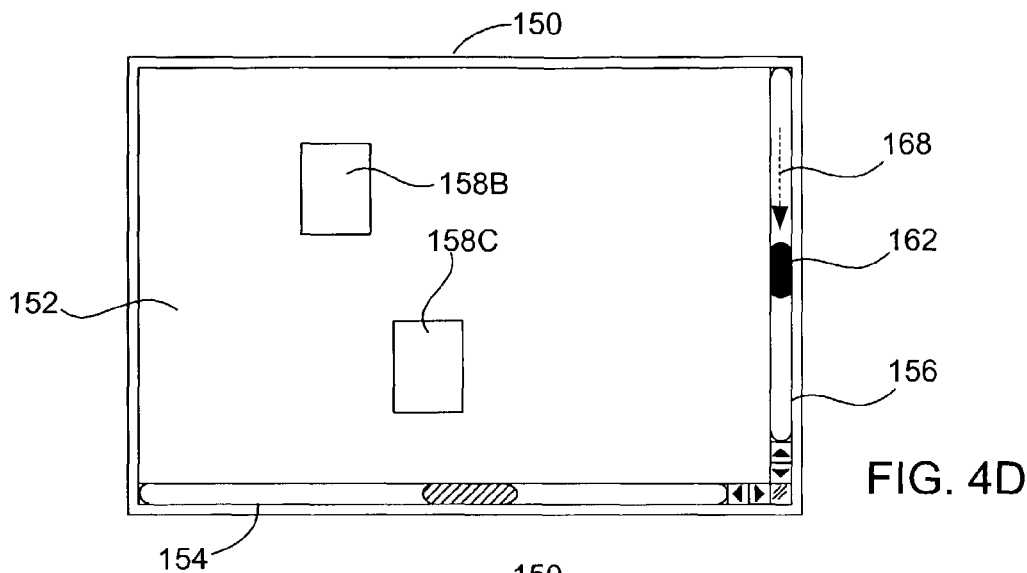

FIG. 4D shows the GUI in the scroll control mode during scrolling movements, i.e., the mouse is moved backwards and the positional data instructs the scroll tab 162 to move down. The scrolling movement is shown by dotted line 168. As shown, the visual indication of the scroll tab remains while the scroll tab 162 is moved. Furthermore, the contents of the window 152 are moved in lieu of the scroll tab movements 168 (e.g., scrolling). For example, as shown, the first icon 158A is moved off of the window 152 at the top of the window 152 while a third icon 158C is brought into the window 152 at the bottom of the window 152.

Figure 4E:
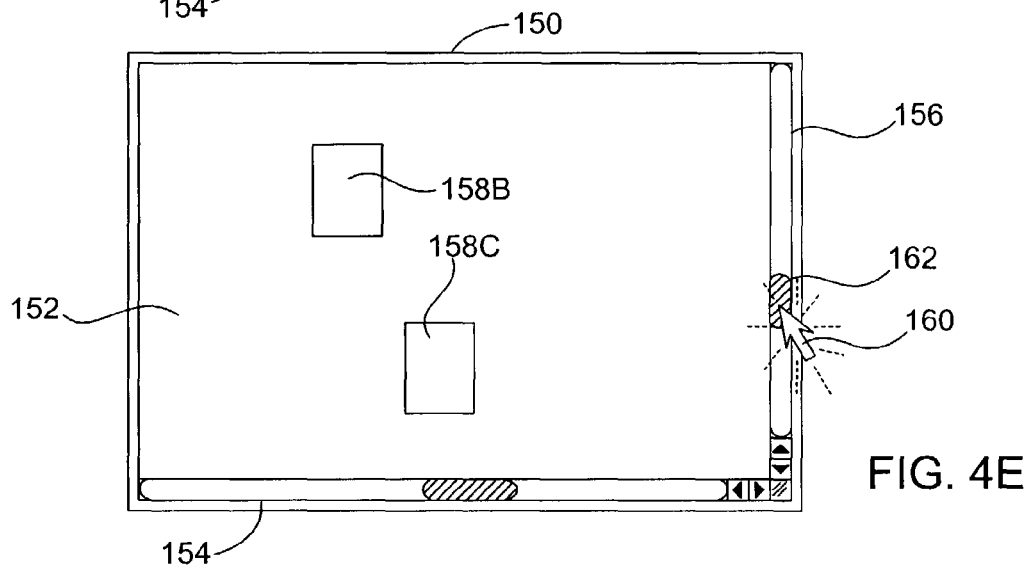

FIG. 4E shows the GUI in a transitioning state where a clicking action of the mouse unlocks the scroll lock. For illustration purposes, the clicking action is shown as lines emanating from the pointer 160. Here, the command data from the mouse informs the system to unlock the scroll lock. As shown, the scroll tab 162 has reverted back to its original color and the pointer 160 has reappeared.

Figure 4F:
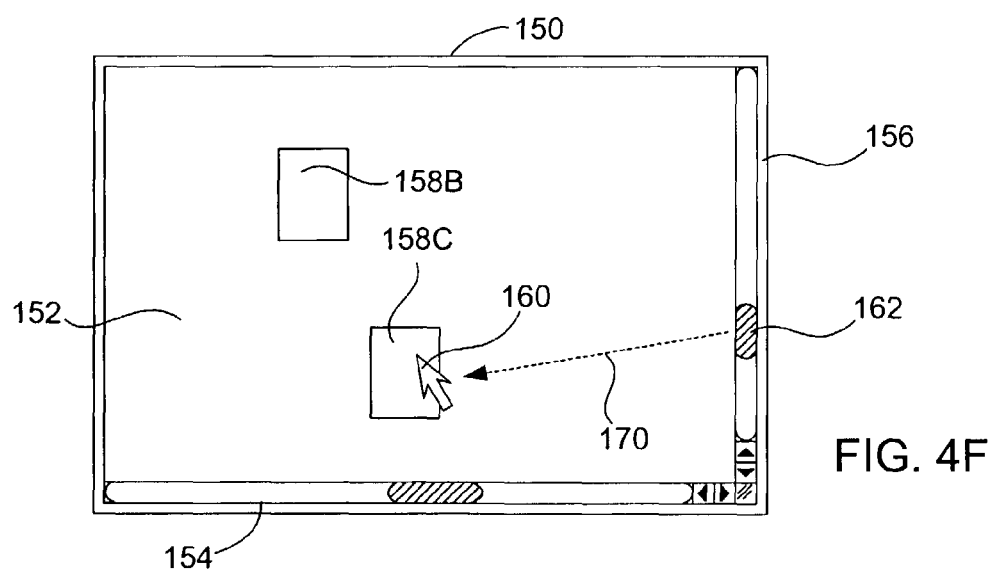

FIG. 4F shows the GUI in a cursor control mode where movements of a mouse correspond to similar movements of the pointer 160. In this particular Figure, the pointer 160 is moved via the mouse from the vertical scroll tab 162 of the vertical scroll bar 158 to the third icon 158C contained in the window 152. The movement is shown by dotted line 170. At this point, the user may select the third icon 158C via a clicking action or perform some other task in the GUI 148.

Figure 5:
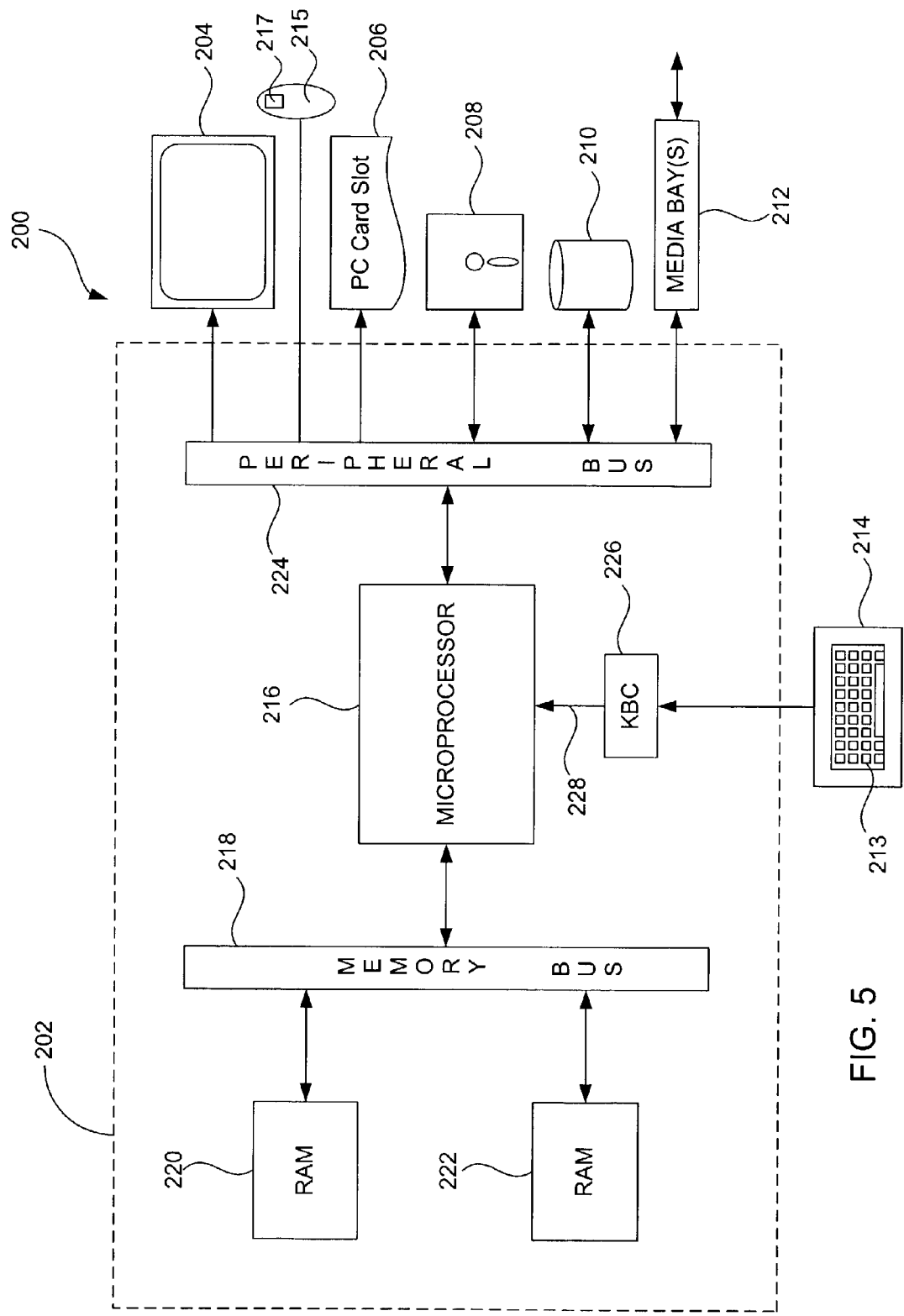
FIG. 5 is a block diagram of an exemplary computer system for carrying out the processing according to the invention.

FIG. 5 is a block diagram of an exemplary computer system 200 for carrying out the processing according to the invention. The computer system 200 includes a digital computer 202, a display screen (or monitor) 204, a printer 206, a floppy disk drive 208, a hard disk drive 210, media bay(s) 212, a keyboard 214 and an input device 215. The digital computer 202 includes a microprocessor 216, a memory bus 218, random access memory (RAM) 220, read only memory (ROM) 222, a peripheral bus 224, and a keyboard controller 226. The digital computer 202 can be a personal computer, a workstation computer, or some other type of computer.

The microprocessor 216 is a general purpose digital processor which controls the operation of the computer system 200. The microprocessor 216 can be a single-chip processor or can be implemented with multiple components. Using instructions retrieved from memory, the microprocessor 216 controls the reception and manipulation of input data and the output and display of data on output devices. According to the invention, as described above, some particular functions of microprocessor 216 is to provide and display a GUI on the display 204, and to implement switch or lock processing.

The memory bus 218 is used by the microprocessor 216 to access the RAM 220 and the ROM 222. The RAM 220 is used by the microprocessor 216 as a general storage area and as scratch-pad memory, and can also be used to store input data and processed data. The RAM 220 also preferably stores the various data structures illustrated in the previous Figures. The ROM 222 can be used to store instructions or program code followed by the microprocessor 216 as well as other data.

The peripheral bus 224 is used to access the input, output, and storage devices used by the digital computer 202. In the described embodiment, these devices include the display screen 204, the printer device 206, the floppy disk drive 208, the hard disk drive 210, and the media bay(s) 212. The keyboard controller 226 is used to receive input from the keyboard 214 and send decoded symbols for each pressed key to the microprocessor 216 over bus 228. Alternatively, the keyboard may be connected to the peripheral bus 224.

The display screen 204 is an output device that displays images of data provided by the microprocessor 216 via the peripheral bus 224 or provided by other components in the computer system 200. The printer device 206 when operating as a printer provides an image on a sheet of paper or a similar surface. Other output devices such as a plotter, typesetter, etc. can be used in place of, or in addition to, the printer device 206.

The floppy disk drive 208 and the hard disk drive 210 can be used to store various types of data. The floppy disk drive 208 facilitates transporting such data to other computer systems, and hard disk drive 210 permits fast access to large amounts of stored data.

The microprocessor 216 together with an operating system operate to execute computer code and produce and use data. The computer code and data may reside on the RAM 220, the ROM 222, or the hard disk drive 220. The computer code and data could also reside on a removable program medium and loaded or installed onto the computer system 200 when needed. Removable program mediums include, for example, CD-ROM, PC-CARD, floppy disk, magnetic tape, and a network component.

The one or more media bays (expansion bays) 212 are used to receive media bay devices (expansion bay devices) to provide greater resources to the computer system. As examples, the types of devices include a floppy drive, a hard drive, a CD-ROM drive, a DVD drive, or a battery. The media bays are accessible from external to the computer system so that media bay devices can be easily be inserted into the media bays or removed from the media bays. The removability of the media bay devices allows a few media bays to support a variety of different types of devices in a flexible manner.

The keyboard 214 is used by a user to input commands and other instructions to the computer system 200. For example, the keyboard 214, which includes a plurality of keys 213, may allow a user of the computer system 200 to enter alphanumeric data. In addition, the keyboard may include a command generator (in the form of a key) for executing tasks such as GUI selections.

The input devices 215 are used by a user to manipulate movements on a display screen of a general-purpose computer, i.e., the input devices may be used to move a cursor or pointer or to implement a scrolling function. By way of example, the input devices may take the form of a mouse, a track ball, a touch pad, a stylus, a tablet and the like. The input devices may also allow a user to make selections via a command generator 217 such as a button.

The advantages of the invention are numerous. Different embodiments or implementations may have one or more of the following advantages. One advantage of the invention is that mode switching may be implemented using any mouse including a single button mouse. That is, the invention eliminates the need for a dedicated scroll button. Another advantage of the invention is that scrolling may be implemented in an ergonomic manner, i.e., without continuously holding down a button.

While this invention has been described in terms of several preferred embodiments, there are alterations, permutations, and equivalents, which fall within the scope of this invention. For example, although the scroll control mode has been described in terms of a scroll tab lock, it should be noted that this is not a limitation. That is, the scrolling control mode may correspond to other types of scrolling features (without using the scroll tabs). It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for scrolling within a Graphical User Interface (GUI) that includes a window with a field having a plurality of predetermined areas surrounded by a window frame separate from the field, said separate window frame including a vertical scroll bar having a vertical scroll tab and a horizontal scroll bar having a horizontal scroll tab, the method comprising:

in a cursor control mode, moving a cursor within the GUI in response to positional data received from a cursor control device, wherein the movement of the cursor within the GUI is directly based on the positional data and the cursor does not move when the there is no change in the received positional data;

receiving a clicking action from a button of the cursor control device in response to a user of the GUI clicking the button, the clicking action comprising a button press event and a button release event;

entering a scroll control mode in response to the received clicking action, in response to determining that the clicking action was received when the cursor was positioned within one of the plurality of predetermined areas in the field, said plurality of predetermined areas including separate predetermined areas that are located proximate to the vertical scroll tab, proximate to the horizontal scroll tab, and elsewhere within the field, wherein a vertical scroll control mode is entered in response to determining that the clicking action was received when the cursor was positioned within a predetermined area proximate to the vertical scroll tab, a horizontal scroll control mode is entered in response to determining that the clicking action was received when the cursor was positioned within a predetermined area proximate to the horizontal scroll tab, and a panning scroll mode is entered in response to determining that the clicking action was received when the cursor was positioned within a predetermined area located elsewhere within the field;

wherein in the scroll control mode, scrolling of the contents of the window is directly based only on positional data received from the cursor control device in the direction of entered scroll control mode, and the contents of the window do not scroll when there is no change in the received positional data, whereby any time the positional data received from the cursor control device indicates no movement in the scroll control mode, the contents of the window do not scroll, and whereby if there is no horizontal change in the positional data received from the cursor control device when in horizontal scroll control mode, then the contents of the window do not scroll, and whereby if there is no vertical change in the positional data received from the cursor control device when in vertical scroll control mode, then the contents of the window do not scroll;

determining that a time period of inactivity has elapsed during which there was no activity by the cursor control device, such that no horizontal change and no vertical change in the received positional data and no clicking actions are received from the cursor control device during the inactive time period; and returning to the cursor control mode from the scroll control mode in response to the determination that the time period of inactivity has elapsed, wherein in the cursor control mode the movement of the cursor within the GUI is directly based on the positional data and the cursor does not move when the there is no change in the received positional data.

2. The method of claim 1, wherein the cursor control device comprises a mouse, and wherein the positional data received from the mouse corresponds with movements of the mouse in relation to a surface upon with the mouse is in contact, such that the mouse is not being moved when there is no change in the received positional data.

3. The method of claim 2, wherein the received clicking action is performed using a primary button of the mouse.

4. The method of claim 3, wherein the primary button of the mouse is not dedicated to scrolling functionality.

5. The method of claim 1, wherein the cursor control device comprises a touch pad, and wherein the positional data received from the touch pad corresponds with movements of a user's finger or stylus over the surface of the touch pad, such that the finger or stylus is not being moved when there is no change in the received positional data.

6. The method of claim 5, wherein the received clicking action is performed using a primary button associated with the touch pad.

7. The method of claim 6, wherein the primary button associated with the touch pad is not dedicated to scrolling functionality.

8. The method of claim 1, wherein the cursor control device comprises a trackball or a joystick.

9. The method of claim 1, further comprising changing an appearance of the scroll tab to indicate being in the scroll control mode in response to entering the scroll control mode.

10. The method of claim 1, further comprising:

receiving a second clicking action; and returning to the cursor control mode from the scroll control mode in response to the received second clicking action, wherein in the cursor control mode the movement of the cursor within the GUI is directly based on the positional data and the cursor does not move when the there is no change in the received positional data.

11. The method of claim 10, further comprising changing the appearance of the scroll tab to indicate no longer being in the scroll control mode in response to returning to the cursor control mode.

12. The method of claim 9, further comprising changing the appearance of the scroll tab to indicate no longer being in the scroll control mode in response to returning to the cursor control mode.

13. A system comprising: a display;

a window to display window contents, the window having a field having a plurality of predetermined areas surrounded by a separate window frame, the separate window frame including a vertical scroll bar having a vertical scroll tab and a horizontal scroll bar having a horizontal scroll tab;

a cursor control mode, during which a user can move a cursor within a graphical user interface (GUI) in response to positional data received from a cursor control device controlled by the user, wherein the movement of the cursor within the GUI is directly based on the positional data and the cursor does not move when the there is no change in the received positional data;

a scroll control mode that is entered when the user performs a clicking action comprising a button press and a button release event with a button of the cursor control device when the cursor is positioned within one of the plurality of predetermined areas in the field, said plurality of predetermined areas including separate predetermined areas that are located proximate to the vertical scroll tab, proximate to the horizontal scroll tab, and elsewhere within the field, wherein a vertical scroll control mode is entered in response to determining that the clicking action was received when the cursor was positioned within a predetermined area proximate to the vertical scroll tab, a horizontal scroll control mode is entered in response to determining that the clicking action was received when the cursor was positioned within a predetermined area proximate to the horizontal scroll tab, and a panning scroll mode is entered in response to determining that the clicking action was received when the cursor was positioned within a predetermined area located elsewhere within the field, wherein in the scroll control mode, scrolling of the contents of the window is directly based only on positional data received from the cursor control device in the direction of entered scroll control mode, and the contents of the window do not scroll when there is no change in the received positional data, whereby any time the positional data received from the cursor control device indicates no movement in the scroll control mode, the contents of the window do not scroll, and whereby if there is no horizontal change in the positional data received from the cursor control device when in horizontal scroll control mode, then the contents of the window do not scroll, and whereby if there is no vertical change in the positional data received from the cursor control device when in vertical scroll control mode, then the contents of the window do not scroll; and an inactivity timeout interval comprising a threshold time period, that if elapsed without any activity received from the cursor control device including horizontal change or vertical change in the received positional data and clicking actions, causes the GUI to return to the cursor control mode from the scroll control mode in response to the lapsing of the inactivity timeout interval.

14. The system of claim 13, wherein the cursor control device comprises a mouse, and wherein the positional data received from the mouse corresponds with movements of the mouse, such that the mouse is not being moved when there is no change in the received positional data.

15. The system of claim 14, wherein the clicking action is performed using a primary button of the mouse.

16. The system of claim 15, wherein the primary button of the mouse is not dedicated to scrolling functionality.

17. The system of claim 13, wherein the cursor control device comprises a touch pad, and wherein the positional data received from the touch pad corresponds with movements of the user's finger or stylus over the surface of the touch pad, such that the finger or stylus is not being moved when there is no change in the received positional data.

18. The system of claim 17, wherein the clicking action comprises a is performed using a primary button associated with the touch pad.

19. The system of claim 18, wherein the primary button associated with the touch pad is not dedicated to scrolling functionality.

20. The system of claim 13, wherein the cursor control device comprises a trackball or a joystick.

21. The system of claim 13, wherein the appearance of the scroll tab changes to indicate being in the scroll control when in scroll control mode.

22. The system of claim 13, wherein the user performing a second clicking action results in switching back to cursor control mode from scroll control mode.

23. The system of claim 13, wherein the elapsing of a threshold period of time without a change in the positional data results in switching back to cursor control mode from scroll control mode.

24. A removable program medium having stored thereon data representing instructions that, when executed by a processor, cause the processor to perform operations comprising:

operating a Graphical User Interface (GUI) that includes a window with a field having a plurality of predetermined areas surrounded by a separate window frame including a vertical scroll bar having a vertical scroll tab and a horizontal scroll bar having a horizontal scroll tab, in a cursor control mode, moving a cursor within the GUI in response to positional data received from a cursor control device, wherein the movement of the cursor within the GUI is directly based on the positional data and the cursor does not move when the there is no change in the received positional data;

receiving a clicking action from a button of the cursor control device in response to a user of the GUI clicking the button, the clicking action comprising a button press even and a button release event;

entering a scroll control mode in response to the received clicking action, in response to determining that the clicking action was received when the cursor was positioned within one of the plurality of predetermined areas in the field, said plurality of predetermined areas including separate predetermined areas that are located proximate to the vertical scroll tab, proximate to the horizontal scroll tab, and elsewhere within the field, wherein a vertical scroll control mode is entered in response to determining that the clicking action was received when the cursor was positioned within a predetermined area proximate to the vertical scroll tab, a horizontal scroll control mode is entered in response to determining that the clicking action was received when the cursor was positioned within a predetermined area proximate to the horizontal scroll tab, and a panning scroll mode is entered in response to determining that the clicking action was received when the cursor was positioned within a predetermined area located elsewhere within the field;

wherein in the scroll control mode, scrolling of the contents of the window is directly based only on positional data received from the cursor control device in the direction of entered scroll control mode, and the contents of the window do not scroll when there is no change in the received positional data, whereby any time the positional data received from the cursor control device indicates no movement in the scroll control mode, the contents of the window do not scroll, and whereby if there is no horizontal change in the positional data received from the cursor control device when in horizontal scroll control mode, then the contents of the window do not scroll, and whereby if there is no vertical change in the positional data received from the cursor control device when in vertical scroll control mode, then the contents of the window do not scroll;

determining that a time period of inactivity has elapsed during which there was no activity by the cursor control device, such that no horizontal change and no vertical change in the received positional data and no clicking actions are received from the cursor control device during the inactive time period; and returning to the cursor control mode from the scroll control mode in response to the determination that the time period of inactivity has elapsed, wherein in the cursor control mode the movement of the cursor within the GUI is directly based on the positional data and the cursor does not move when the there is no change in the received positional data.

25. A removable program medium of claim 24, wherein the cursor control device comprises a mouse, and wherein the positional data received from the mouse corresponds with movements of the mouse, such that the mouse is not being moved when there is no change in the received positional data.

26. A removable program medium of claim 25, wherein the received clicking action is performed using a primary button of the mouse.

27. A removable program medium of claim 26, wherein the primary button of the mouse is not dedicated to scrolling functionality.

28. A removable program medium of claim 24, wherein the cursor control device comprises a touch pad, and wherein the positional data received from the touch pad corresponds with movements of a user's finger or stylus over the surface of the touch pad, such that the finger or stylus is not being moved when there is no change in the received positional data.

29. A removable program medium of claim 28, wherein the received clicking action is performed using a primary button associated with the touch pad.

30. A removable program medium of claim 29, wherein the primary button associated with the touch pad is not dedicated to scrolling functionality.

31. A removable program medium of claim 24, wherein the cursor control device comprises a trackball or a joystick.

32. A removable program medium of claim 24, further comprising changing an appearance of the scroll tab to indicate being in the scroll control mode in response to entering the scroll control mode.

33. A removable program medium of claim 32, further comprising changing the appearance of the scroll tab to indicate no longer being in the scroll control mode in response to returning to the cursor control mode.

* * * * *